United States Patent
Gonzalez Calvo

(10) Patent No.: US 11,319,216 B2
(45) Date of Patent: May 3, 2022

(54) METHOD AND FACILITY FOR STATIONARY THERMAL HYDROLYSIS OF ORGANIC MATERIAL WITH TOTAL ENERGY RECOVERY

(71) Applicant: TE Consulting House 4 Plus, SL, Valladolid (ES)

(72) Inventor: Rafael Gonzalez Calvo, Valladolid (ES)

(73) Assignee: TE Consulting House 4 Plus, SL, Valladolid (ES)

( * ) Notice: Subject to any disclaimer, the term of this patent is extended or adjusted under 35 U.S.C. 154(b) by 0 days.

(21) Appl. No.: 16/462,303

(22) PCT Filed: Dec. 1, 2017

(86) PCT No.: PCT/ES2017/070795
§ 371 (c)(1),
(2) Date: Nov. 6, 2019

(87) PCT Pub. No.: WO2018/115547
PCT Pub. Date: Jun. 28, 2018

(65) Prior Publication Data
US 2021/0017062 A1 Jan. 21, 2021

(51) Int. Cl.
*C02F 1/02* (2006.01)
*C02F 11/18* (2006.01)

(52) U.S. Cl.
CPC ............ *C02F 1/025* (2013.01); *C02F 1/02* (2013.01); *C02F 11/18* (2013.01);
(Continued)

(58) Field of Classification Search
CPC .............. C02F 11/185; C02F 2301/063; C02F 2301/066; C02F 2303/04; C02F 11/04;
(Continued)

(56) References Cited

U.S. PATENT DOCUMENTS

| 8,932,467 B2 * | 1/2015 | Fosbol | ............... C13K 1/04 |
| | | | 210/632 |
| 2004/0060863 A1 * | 4/2004 | Hojsqaard | ............... C02F 11/18 |
| | | | 210/631 |

(Continued)

FOREIGN PATENT DOCUMENTS

| ES | 2570812 A1 | 5/2016 |
| WO | 2015032552 A1 | 3/2015 |

(Continued)

OTHER PUBLICATIONS

International Search Report and Written Opinion of the International Search Authority, PCT/ES2017/070795, ES/ISA, datde Mar. 19, 2018.

*Primary Examiner* — Fred Prince
(74) *Attorney, Agent, or Firm* — Nancy J. Flint, Attorney At Law, P.A.; Nancy J. Flint, Esq.

(57) ABSTRACT

Procedure for the thermal hydrolysis of organic matter in steady state, with a double steam explosion and total energy recovery, which consists, as a minimum, of the 1) feeding stage, stepped pressurization and sequential injection of low, medium and high pressure level steam; 2) first stage of hydrolysis by consecutive steam explosion operations with the production of medium pressure level steam and thermal reaction; 3) second stage of hydrolysis consisting of steam explosion and production of low pressure steam. An installation for the implementation of the process, which consists of comprising pumps for stepped pressurization, fluid-steam mixers, valves, mixers, decompression elements, tanks, piping and instrumentation and control systems.

19 Claims, 1 Drawing Sheet

(52) U.S. Cl.
CPC .. *C02F 2301/063* (2013.01); *C02F 2301/066* (2013.01); *C02F 2301/08* (2013.01); *C02F 2303/04* (2013.01); *C02F 2303/06* (2013.01); *Y02W 10/30* (2015.05)

(58) Field of Classification Search
CPC .. C02F 2303/06; C02F 2301/08; C02F 1/025; C02F 11/18; C02F 1/02; Y02W 10/30
USPC ................................ 210/600, 615, 761, 259
See application file for complete search history.

(56) References Cited

U.S. PATENT DOCUMENTS

| | | | |
|---|---|---|---|
| 2014/0251902 A1* | 9/2014 | Solheim .................. | C02F 11/18 210/609 |
| 2015/0367308 A1* | 12/2015 | Solheim .................. | C02F 11/18 530/500 |
| 2018/0201517 A1* | 7/2018 | DiMassimo ............ | C02F 11/13 |

FOREIGN PATENT DOCUMENTS

| | | | |
|---|---|---|---|
| WO | 2015189449 A1 | 12/2015 | |
| WO | 2016079361 A1 | 5/2016 | |

* cited by examiner

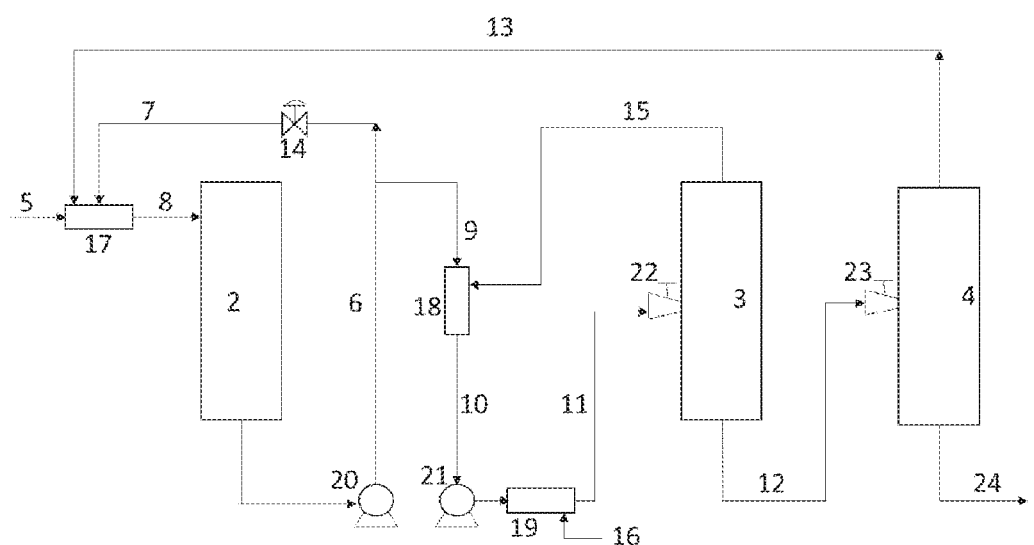

METHOD AND FACILITY FOR STATIONARY THERMAL HYDROLYSIS OF ORGANIC MATERIAL WITH TOTAL ENERGY RECOVERY

TECHNICAL SECTOR OF THE INVENTION

The invention, which includes a procedure and the installation for its implementation, is applied to the field of organic matter treatment, including sewage sludge from wastewater, domestic and industrial waste and any other matter. It finds a special application as a pre-treatment to the anaerobic digestion of solids.

BACKGROUND OF THE INVENTION

In different industrial processes it is necessary to modify the physical and chemical structure of the solids, for which it's necessary to implement a pre-treatment. In the particular case of anaerobic digestion of solids, the hydrolysis stage (solubilization, liquefaction) limits the overall kinetics of the process. To improve the kinetics of the hydrolysis stage, different physical, chemical and biological processes are applied as a previous treatment to anaerobic digestion, with the consequent improvement of the overall methanization process. The process of thermal hydrolysis is based on subjecting the solid to high temperatures and pressures for relatively long periods of time, normally greater than 30 minutes. Subsequently, taking advantage of the high pressure, the hot mass can undergo a process of sudden decompression or flash process, in order to achieve the so-called steam explosion effect that generates a breakage in the solids structure. Other processes use heat exchangers to recover the energy of the hot mass.

All technologies that recover energy by recirculating and condensing the steam produced in the flash stage to heat the feed that reaches the hydrolysis stage, use steam of a single pressure level. As this pressure corresponds to that of the flash chamber, the steam produced is low pressure. With this configuration it is not possible to take advantage of all the energy contained in the steam, which leads to energy inefficient systems. In order to reduce energy consumption, it is necessary to concentrate the feed, up to very high values, with the consequent increase in the costs attributable to this operation, which requires the use of high quantities of chemical products. The patent ES2570812A1, aims to solve the inefficiency by raising the pressure of the steam that leaves the flash chamber using a mechanical compressor, which uses electrical energy and has a complex maintenance, by compressing steam containing condensable and incondensable aggressive products; also, when using electrical energy, the system is energetically inefficient.

Patent ES2538176B1 resolves said energy inefficiency with a radically different conceptual design, which differentiates it from all existing processes and installations. Instead of using a single pressure level steam, it uses steam with two pressure levels. With this configuration and in accordance with the laws of thermodynamics it is possible to recover the energy content of the steam, achieving that the facilities are energetically self-sufficient even operating with moderate concentrations of solids. Starting from this fact, all the procedures and installations that operate with steam explosion use a sequence of thermal reaction stage followed by steam explosion. The claimed process uses a sequence of steam explosion stages+thermal reaction stage+steam explosion stage. This procedure improves the overall kinetics of the process, which leads to more compact installations and lower installation, operation and maintenance costs.

The present patent derives and is a continuation of the patent ES2538176B1, expanding its field of action. The evolution of the pumping equipment and the appearance of new materials allow, at present, to use mechanical impulsion systems on the fluid to be hydrolyzed which are reliable, low maintenance and capable of supporting the operating conditions. In view of this new situation, the present patent, maintaining the fundamental characteristic of operating with total energy recovery, with low residence times and a sequence of stages of steam explosion+thermal reaction+steam explosion, introduces the possibility of using mechanical pumping systems.

EXPLANATION OF THE INVENTION

The present process for the continuous thermal hydrolysis of organic matter consists, as a minimum, of the stages: 1) feeding, stepped pressurization and sequential injection of low, medium and high-pressure level steam; 2) first hydrolysis stage by consecutive operations of steam explosion with production of medium pressure level steam and thermal reaction; 3) second hydrolysis stage consisting of steam explosion and production of low-pressure steam.

In the usual practice of sludge-generating plants, the inlet temperature to such process is that of the environment, however, there is a tendency to take advantage of the energy of surplus streams. This implies a possible wide range of entry temperatures than that of stage 1, which requires a flexible conceptual design of the procedure and the installations.

In stage 1, the organic material to be hydrolyzed (5) is pressurized and heated until reaching the setpoint values prior to its entry (11) to stage 2. Pressurization is achieved, at least, by the mechanical impulsion equipment for fluids (20) and (21). The heating is achieved by the injection of at least low (13), medium (15) and high (16) pressure steams. To achieve an adequate quality of fluid-vapor mixture, at least mixers (17), (18) (19) are used.

The mechanical impulsion equipment for the fluids (20) and (21) and any other to be installed are selected among any type of pumps capable of fluids impulsion, including non-Newtonian ones, and high viscosity suspensions. Particularly in a variant of the invention and thanks to the staggering of pressures, centrifugal pumps can be used, which are cheaper and lower in maintenance costs than positive displacement pumps used by other technologies. They must supply pressures between 1 and 10 barg and operate in a temperature range between 20-180° C.

The mixers (17), (18), (19), are selected between both static and dynamic equipment.

Taking into account the great variability of possible types of organic matter and the pressure, temperature and concentration conditions of the feed (5), the procedure and the installation must be flexible. In a variant of the invention, the output stream (6) of the pump (20) is divided into the streams (7) and (9). The stream (7) after passage through the mixer (17) is returned to the tank (2), so that the pump (20) acts simultaneously as pressurization and recirculation system. In another variant, by closing the valve (14) the output stream (6) of the pump (20) is brought directly to the mixer (18), thus breaking the recirculation loop. The feed (5) and the low steam (13) are conducted directly to the tank (2).

In a variant of the invention, the mixer (17) is an ejector that uses the mass recirculated by the pump (20) as the impulsion fluid. This way, in addition to achieving a good mixing, it is possible to lower the pressure of the chamber (4) and the temperature of the output stream (24). This fact leads to a lower consumption of energy in the process.

According to the energy balances, the fluid (10) cannot reach temperatures higher than 170° C., which the literature marks as the limit for the development of secondary reactions that lead to the formation of recalcitrant, non-biodegradable and potentially toxic compounds. In the mixer (19) the extremely rapid mixture of live steam (16) and fluid to be hydrolyzed (10) is achieved, reaching temperatures that can reach up to 220° C. The heating is carried out in extremely short periods of times, less than 5 seconds, so that said secondary reactions are prevented.

The fluid (11) at high temperature and pressure passes through the element (22) able to cause instantaneous decompression, with the consequent temperature drop, generating a first breakage in the structure of the solid by the steam explosion mechanism. In the tank (3), a medium pressure steam flow (15) is produced which is conducted to stage 1. The liquid fraction that has suffered a first steam explosion is kept inside the tank (3) between 1 and 15 minutes, thus allowing the temperature hydrolysis reaction process to take place. The pre-hydrolyzed organic matter stream (12) is conducted to stage 3.

In a variant which is operated with sewage sludge without prior treatment, the tank (3) is controlled so that the temperature of the liquid inside can never exceed 170° C. In another variant operated with previously digested sludge or with organic matter from another source, the temperature can rise to higher values, always below the secondary reactions appearance limit.

The fluid (12) whose pressure is that of equilibrium with the temperature imposed as a reference to the tank (3) is depressurized when crossing the element (23). In the tank (4) the low-pressure steam stream (13), which is carried to stage 1 and the stream of hydrolyzed organic matter (24) that is brought to digestion are separated.

In a variant of the invention, the tank pressure (4) is slightly higher than the atmospheric pressure, in the range between 0-0.2 barg. In another variant and due to the effect of the mixer (17), which in this variant is an ejector acting as a vacuum system, the pressure in the tank (4) can be sustained between −0.5 and 0 barg.

As a consequence of the procedure used, the system not only operates continuously, but unlike existing technologies, it also operates in a steady state. This means that once the operating variables have been prefixed (e.g. flows, levels, pressures and temperatures), they do not change over time. This behavior leads to processes that operate with greater stability, require simpler control systems, are more flexible and robust, and obtain better performance.

BRIEF DESCRIPTION OF THE FIGURES

FIG. 1 shows a diagram of the installation for the implementation according to the invention.

EXPLANATION OF AN EMBODIMENT

Following FIG. 1 the procedure is described according to the invention claimed and the means used to perform an installation.

The means used are: tanks or deposits (2), (3), (4); mechanical impulsion and fluid pressurization equipment (20), (21); fluid-steam mixers (17), (18), (19); expansion elements (22), (23).

In the selected variant, sewage sludge is hydrolyzed, previously concentrated and at room temperature (5). In the ejector (17), the feed mixture (5) is produced, with low pressure steam (13) and with the recirculation stream (7). The output stream (8) of the ejector is returned to the deposits (2), in order to close a recirculation loop. All low steam (13) condenses in the system. Depending on the design conditions and the recirculation flow rates imposed, the stream (9) exiting the recirculation loop has a temperature between 70 and 100° C. and a pressure with values between 3 and 8 barg.

The stream (9) after the first pressurization and heating stage receives the medium pressure vapor (15) in the mixer (18). According to the energy balances, in the operating conditions the temperature after the incorporation of medium and high-pressure steam streams moves between 120 and 160° C., without reaching the thermal level corresponding to the development of secondary reactions. This fluid (10) is pressurized by the pump (21), reaching pressures between 8 and 20 barg. In the ultra-fast mixer (19) the fluid receives a live steam injection (16) with a pressure between 10 and 22 barg, capable of raising its temperature to 160-220° C.

After this ultra-rapid heating, the high temperature and pressure sludge (11) passes through the decompression element (22) and splits in the tank (3) in a medium pressure steam stream (15) which is conducted to the stage 1 and in a liquid stream (12). The liquid is kept in the tank (3), during a predetermined time, which varies between 1 and 15 minutes. With this sequence the organic matter is first subjected to a steam explosion process and then to a reaction process by thermal process. Consequently, the tank (3) fulfils the double function of flash tank and reactor. In the case described, the temperature inside the tank (3) is maintained at a pre-set and controlled setpoint value between 140 and 180° C.

After remaining in the tank (3) during the pre-set reaction time, the pre-hydrolyzed organic material stream (12), with a pressure between 3 and 9 barg, passes through the decompression element (23) and into the tank (4), which acts as a flash chamber, splits in a low pressure steam stream (13) that is carried to stage 1 and in a stream (24) of hydrolyzed sludge that is brought to digestion. The tank pressure (4) can vary between −0.5 and 0.5 barg. In the variant described and with the ratio of liquid recirculating the pump (20) the pressure in the tank (4) is −0.1 barg and the outlet temperature of the stream (24) is 97° C.

The invention claimed is:

1. A process for continuous thermal hydrolysis of organic matter comprising:
   a first stage of a feeding of a first feedstock comprising organic matter mixed with an injection of a low pressure steam having a pressure of between −0.5 barg to 0.5 barg into a first hydrolysis tank;
   a second stage of a feeding of a second feedstock comprising organic matter mixed with an injection of a high pressure steam having a pressure of between 10 barg to 22 barg into a second hydrolysis tank,
   wherein a first stage of hydrolysis by a first steam explosion and a first thermal reaction takes place in the second hydrolysis tank resulting in a production of a mix of a third feedstock and a medium pressure steam having a pressure of between 3 barg and 9 barg,
   wherein further the third feedstock is fed into a third tank,
   wherein further a second stage of hydrolysis by a second steam explosion takes place in the third hydrolysis tank resulting in a production of the low pressure steam pressure level steam and a stream of hydrolyzed organic matter.

2. The process of claim 1,
wherein a first hydrolysis tank effluent exiting from the first hydrolysis tank is circulated by a first pump, wherein further the first hydrolysis tank effluent comprises a temperature of 70° C. to 100° C.,
wherein a first portion of the first hydrolysis tank effluent is recirculated to a first mixer and a second portion of the first hydrolysis tank effluent is fed to a second mixer,
wherein the first portion of the first hydrolysis tank effluent is mixed in the first mixer with the low pressure steam and subsequently fed into the first hydrolysis tank.

3. The process of claim 2, wherein the first pump comprises a non-Newtonian pump, a suspension pump or centrifugal pump.

4. The process of claim 1,
wherein the second portion of the first hydrolysis tank effluent is mixed in a second mixer with the medium pressure steam to create the second feedstock,
wherein the second feedstock is subsequently fed by a second pump to a third mixer, wherein the second feedstock is mixed in the third mixer with the high pressure steam and subsequently fed into the second hydrolysis tank.

5. The process of claim 4 wherein a temperature of the second feedstock exiting the second mixer does not exceed 170° C.

6. The process of claim 5 wherein the temperature of the second feedstock exiting the second mixer is between 120° C. and 160° C.

7. The process of claim 4 wherein the second feedstock is heated in the third mixer to a temperature between 160° C. and 220° C.

8. The process of claim 7 wherein the second feedstock is heated in the third mixer to a temperature of no more than 220° C. for less than 5 seconds.

9. The process of claim 4, wherein the second pump comprises a non-Newtonian pump, a suspension pump or centrifugal pump.

10. The process of claim 4 wherein the second feedstock that is mixed with the high pressure steam is fed into the second hydrolysis tank through a first decompression element.

11. The process of claim 10 wherein the maximum pressure of an outlet of the first decompression element is 8 barg.

12. The process of claim 10 wherein the second feedstock remains resident in the second hydrolysis tank for a time between 1 minute and 15 minutes.

13. The process of claim 12 wherein the temperature in the second hydrolysis tank is between 140° C. and 180° C.

14. The process of claim 13 wherein the second feedstock subsequently splits in the second hydrolysis tank to form the third feedstock and the medium pressure steam, wherein further the third feedstock has a pressure between 3 barg and 9 barg.

15. The process of claim 14 wherein the third feedstock that is fed into the third tank through a second decompression element.

16. The process of claim 15 wherein the temperature in the third tank is 97° C.

17. The process of claim 16 wherein the third feedstock subsequently splits in the third tank to form the hydrolyzed organic matter and the low pressure steam, wherein further the pressure in the third tank is between −0.5 barg and 0.5 barg.

18. The process according to any one of the preceding claims, wherein the organic matter comprises sewage sludge, domestic waste, industrial waste or combinations thereof.

19. The process according to any of claim 1, 2, 3, 4, 5, 6, 7, 8, 9, 10, 11, 12, 13, 14, 15, 16 or 17, further comprising a pre-treatment for an anaerobic digestion of solids.

* * * * *